Jan. 17, 1939.   H. WELLBAUM   2,144,302
BREAD SLICING MACHINE
Filed Aug. 26, 1936   3 Sheets-Sheet 3
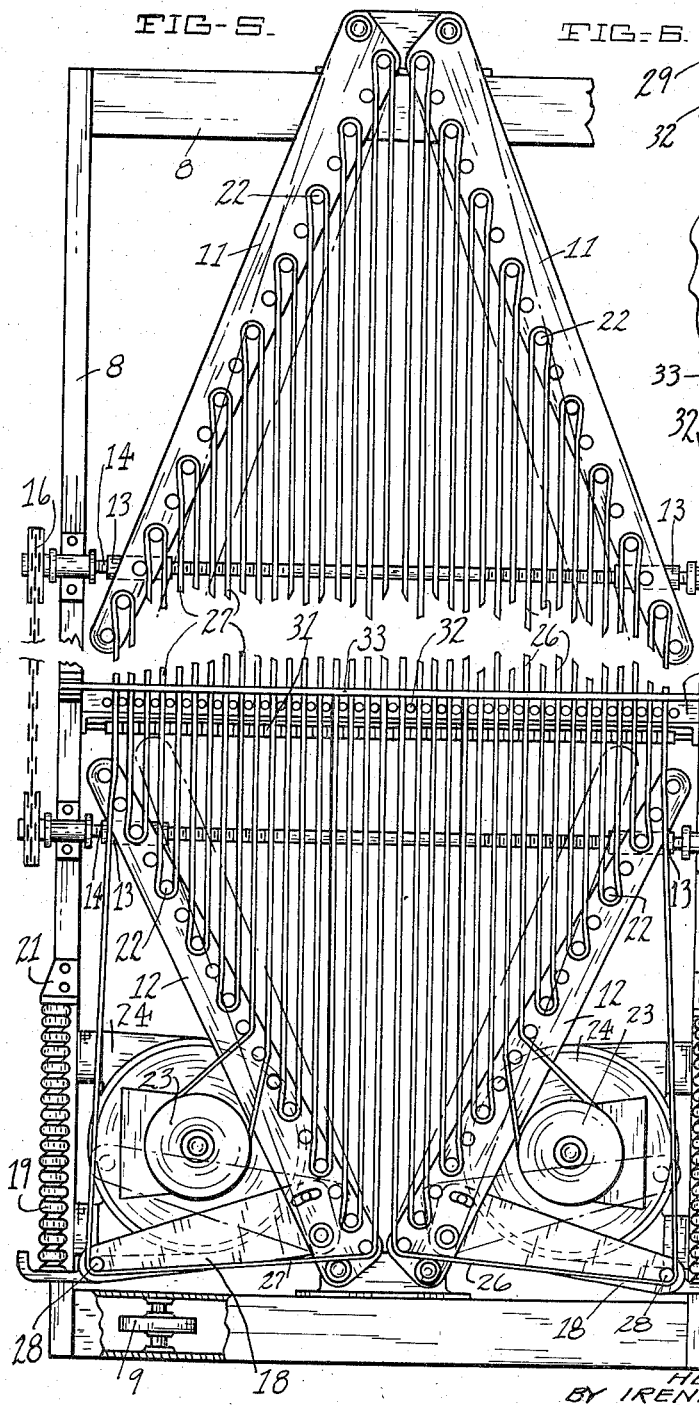
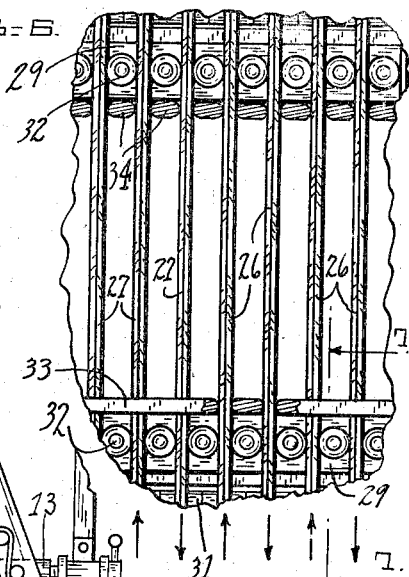
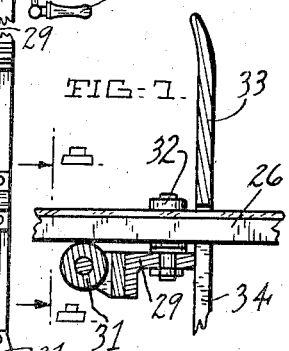
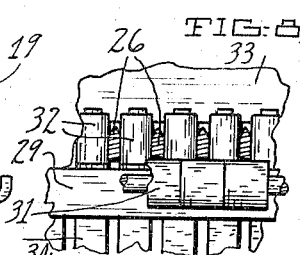
INVENTOR
HERMAN WELLBAUM, DEC.,
BY IRENE WELLBAUM, ADMX.
BY Victor J. Evans Co.
ATTORNEYS Patented Jan. 17, 1939

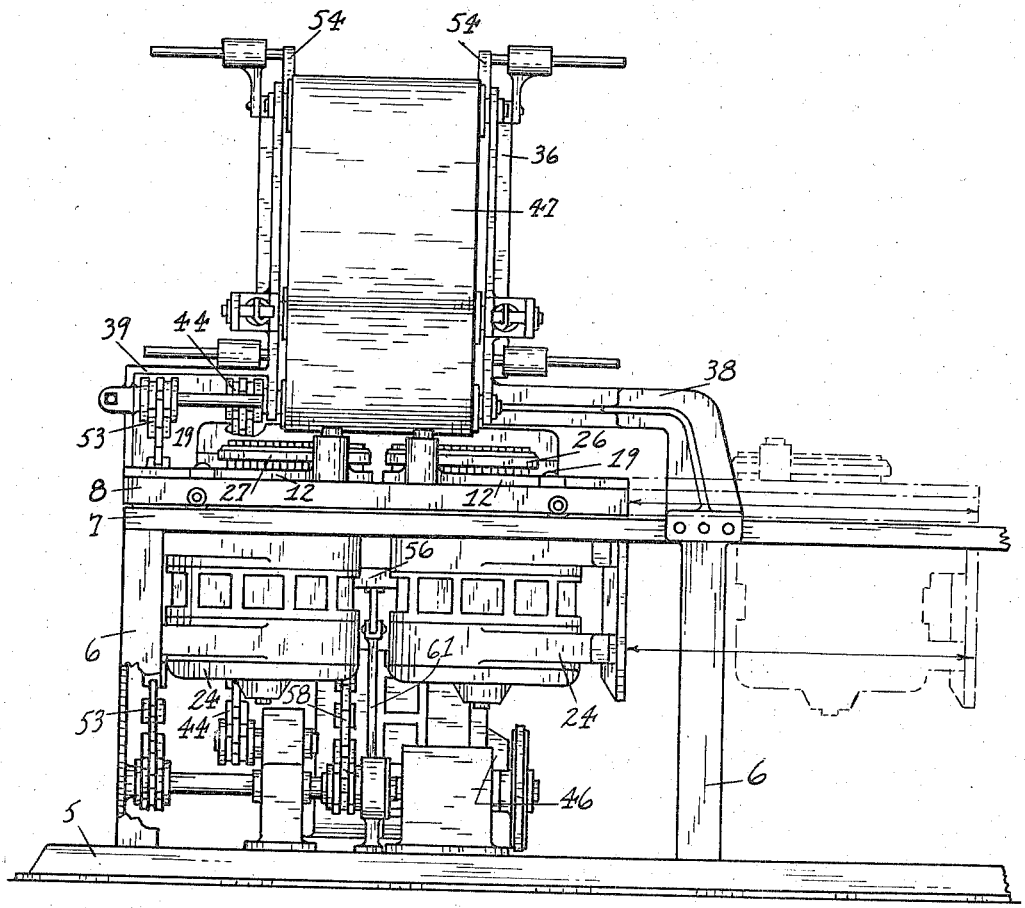

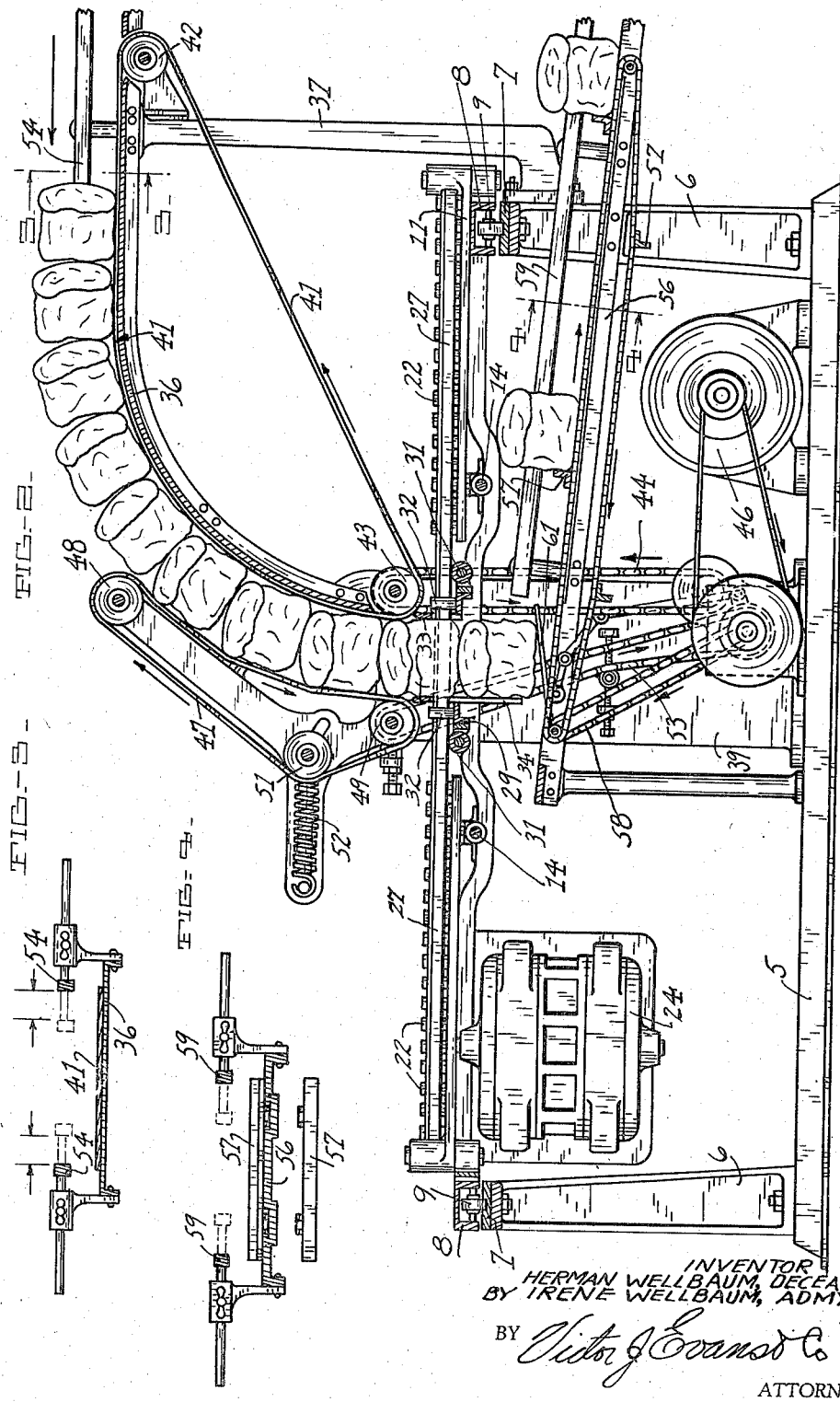

2,144,302

UNITED STATES PATENT OFFICE 2,144,302

BREAD SLICING MACHINE

Herman Wellbaum, deceased, late of Lynwood, Calif., by Irene Wellbaum, administratrix, Lynwood, Calif.

Application August 26, 1936, Serial No. 98,016

2 Claims. (Cl. 146—88)

This invention relates to improvements in bread slicing machines and has particular reference to a device for feeding a whole loaf of bread through a plurality of cutters and delivering the loaf with the sliced pieces in their same relative position as before cutting, so that the same may be readily wrapped as a complete loaf.

A further object is to produce a device of this character which may be readily adjusted so as to cut slices of various thickness.

A further object is to produce a device of this character which is economical to manufacture, easy to operate, and a device which takes up a minimum amount of floor space.

A still further object is to produce a device wherein adjustments may be readily made without causing unnecessary delay in the operation of the same.

Other objects and advantages will be apparent during the course of the following description.

In the accompanying drawings forming a part of this specification and in which numerals are employed to designate like parts throughout the same, Fig. 1 is an end elevation of my device, looking from the left of Fig. 2;

Fig. 2 is a side elevation, partly in cross section, of Fig. 1, looking from the right of Fig. 1;

Fig. 3 is a fragmentary detailed cross sectional view taken on the line 3—3 of Fig. 2;

Fig. 4 is a fragmentary detailed cross sectional view taken on the line 4—4 of Fig. 2;

Fig. 5 is a top plan view of the slicer mechanism;

Fig. 6 is a fragmentary detailed view on an enlarged scale of the cutter guide rollers;

Fig. 7 is a fragmentary detailed cross sectional view taken on the line 7—7 of Fig. 6; and Fig. 8 is a fragmentary detailed cross sectional view taken on the line 8—8 of Fig. 7.

Due to present day demands, loaves of bread produced by bakeries in most instances are now sliced and wrapped for delivery. The slicing operation is important in that the bread is usually sliced warm, and, therefore, the same must be handled carefully and cut in such a manner as not to tear the bread or make the same heavy; and in order to maintain a fluffy texture, there is produced a machine which will cut the bread without injury thereto.

In the accompanying drawings wherein for the purpose of illustration is shown a preferred embodiment of my invention, the numeral 5 designates a base having uprights 6, upon which are positioned tracks 7, and upon these tracks is mounted a frame 8, which is provided with rollers 9, moving upon the tracks 7. This arrangement permits the frame 8 to be slid longitudinally, the purpose of which will be later seen. Pivoted to the frame 8 are arms 11 and 12. These arms have their free ends pivoted to travellers 13, movable on cross shafts 14. These cross shafts are journalled in the frame 8 and are connected together by a chain 16. A crank 17 provides a means for rotating both shafts 14 simultaneously. The arms 12 have pivoted thereto tension arms 18, which engage one end of the tension springs 19, the opposite end of which springs is connected to brackets 21, mounted upon the frame 8. The arms 11 and 12 carry a plurality of rollers 22, and adjacent each of the arms 12 is positioned a pulley wheel 23 in alignment with the rollers 22. Each pulley wheel is driven by its motor 24. There is employed two continuous cutter elements 26 and 27, one for each side of the machine, which cutter elements are passed over the rollers 22 and the pulleys 23. These cutting elements are also passed over the tension rollers 28. In order to guide the cutting elements and to hold them uniformly spaced against any up and down or side movement, there is provided a guide bar 29, having rollers 31, which contact the under surface of the cutters 26 and 27. This guide bar also carries upstanding rollers 32, which lie between the cutting elements. There are two of these guide bars 29, as indicated in Fig. 6. Positioned adjacent the guide bars is an upstanding plate 33 having fingers 34, which pass downwardly between the cutting elements. The description thus far relates to means for slicing the bread.

Referring now to Fig. 2, there is illustrated means for delivering the bread to and through the cutting elements and from the cutting elements. This delivery means consists of a curved member 36 suitably supported above the cutting elements, as by standards 37, 38, and 39. A conveyor belt 41 passes over this curved plate and over pulleys 42 and 43 at each end thereof. The pulley 43 is driven by a chain 44 from a reversing gear, which in turn is driven by a pulley 46. A belt 47 passes over pulleys 48 and 49 and over a tension pulley 51, which is tensioned by a spring 52. The pulleys 51 and 49 may be adjustable either toward or away from the curved plate 36. The pulley 49 is driven by a chain 53 from the pulley 46. Guide bars 54 are adjustably positioned so as to guide the loaves of bread of various lengths. Mounted beneath the cutting elements is a second conveyor 56 having cross pieces 57 thereon. This conveyor is driven by a chain 58 from the pulley 46. Guide bars 59 serve the same purpose as the guide bars 54. The pulley 46 is driven from the wrapping machine to which the sliced bread is being delivered. It is apparent that these two machines must operate in perfect synchronization. It is to be noted that the belts 41 and 47 must be driven through a variable speed device and clutch by the pulley 46. The variable speed device is adjusted so as to provide for the proper sequence of loaves passing through the machine. The trip 61 is so adjusted that it is depressed an instant before the cleat 57 carries the loaf away to be wrapped. Therefore, at this moment, the clutch or speed mechanism is disengaged, and the motion of the belts 41 and 47 ceases until the loaf is carried off from the trip plate 61; and then the cycle is again repeated. A clutch arrangement is actuated by a trip 61, whereby the conveyor 56 is only actuated after a loaf of bread engages the trip and comes to rest upon the conveyor. Thus, the cross bars 57 will not scrape across the bottom of the loaf of bread and injure the same.

It will thus be seen that with this structure, it is possible to deliver loaves of bread between the guides 54 and on to the conveyor belts 41 and 47, whereby the loaves will be fed downwardly between the upstanding plate 33, thence through the cutting elements and onto the lower conveyor and finally reach the point of discharge, sliced and with the slices in their same relative position as they occupied in the original loaf of bread; and that by moving the frame 8 upon its rollers 9 to one side, as indicated in dotted lines in Fig. 1, the bars 29 may be moved together with their rollers and the upstanding plate 33; and then by rotating the crank 17, the arms 11 and 12 may be pivoted inwardly, as indicated in dotted lines in Fig. 5, or in an opposite direction, so that the cutting elements will be moved closer together or further apart, depending upon the direction of rotation of the crank 17. Then by inserting a new guide with a new set of rollers of the correct size, the entire device may be moved back into cutting position and loaves of bread fed thereto and therethrough.

It is to be understood that the form of this invention herewith shown and described is to be taken as a prefered example of the same and that various changes relative to the material, size, shape and arrangement of parts may be resorted to without departing from the spirit of the invention or the scope of the subjoined claims.

Having thus described this invention, it is claimed:—

1. In a device for slicing bread, a base, tracks supported above said base, a frame slidable on said tracks, a pair of diverging arms pivoted to the opposite ends of said frame and forming a substantially diamond-shaped cutting element, means comprising transversely arranged screws engaging said arms for simultaneously moving said arms about their pivot points, rollers carried on said arms, band-like cutting elements passed over said rollers and extending between the arms at the opposite ends of said frame so as to produce parallel portions throughout the length of said cutting elements, said parallel portions travelling in opposite directions when said cutting elements are moving, and motor driven means for moving said cutting elements.

2. In a device for slicing bread, a base, tracks supported above said base, a frame slidable on said tracks, pairs of diverging arms pivoted to the opposite ends of said frame and comprising a substantially diamond-shaped cutting element, means for simultaneously moving all of said arms about their pivot points, rollers carried on said arms, cutting elements passing over said rollers, cutting elements extending between the rollers of the opposite arms at the opposite ends of said frame, whereby parallel portions of said cutting element may be moved in opposite directions with respect to the adjacent parallel portion, guide means underlying said parallel portions to maintain said portions spaced and in the same plane, arcuately disposed conveyor means for feeding loaves of bread downwardly against said cutting elements, said means including a pair of conveyors, one of said conveyors supporting the loaves of bread, the other of said conveyors exerting a pressure against said loaves of bread to effect an even feeding of the same to the cutting element, and conveyor means associated with said first mentioned conveyors to deliver the cut bread.

IRENE WELLBAUM,
*Administratrix of the Estate of Herman Wellbaum, Deceased.*